(12) United States Patent
Quinlan et al.

(10) Patent No.: US 10,212,256 B2
(45) Date of Patent: Feb. 19, 2019

(54) DELEGATING DATABASE QUERIES

(71) Applicant: Facebook, Inc., Menlo Park, CA (US)

(72) Inventors: Sean Bradley Quinlan, San Rafael, CA (US); Harrison C. Wong, East Palo Alto, CA (US); Jeremy David Fein, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 69 days.

(21) Appl. No.: 14/968,449

(22) Filed: Dec. 14, 2015

(65) Prior Publication Data

US 2017/0168802 A1 Jun. 15, 2017

(51) Int. Cl.
*G06F 17/30* (2006.01)
*H04L 29/06* (2006.01)
*H04L 29/08* (2006.01)
*G06F 8/61* (2018.01)

(52) U.S. Cl.
CPC ............. *H04L 67/42* (2013.01); *G06F 8/61* (2013.01); *G06F 17/30023* (2013.01); *H04L 67/26* (2013.01); *H04L 67/34* (2013.01)

(58) Field of Classification Search
CPC ...... G06F 8/61; G06F 17/30–17/30997; H04L 67/42
See application file for complete search history.

(56) References Cited

U.S. PATENT DOCUMENTS

| | | | | |
|---|---|---|---|---|
| 6,557,039 B1 * | 4/2003 | Leong | ............... | G06F 17/30073 707/E17.032 |
| 2003/0014398 A1 * | 1/2003 | Ohta | ................. | G06F 17/30864 |
| 2008/0086525 A1 * | 4/2008 | Angwin | ............ | G06F 17/30876 709/203 |
| 2008/0147602 A1 * | 6/2008 | Anderson | ............ | G06F 9/4443 |
| 2009/0132500 A1 * | 5/2009 | Jones | ................ | G06F 17/30864 |
| 2012/0254155 A1 * | 10/2012 | Heim | ................ | G06F 17/30979 707/721 |
| 2012/0331000 A1 * | 12/2012 | Mehra | ............... | G06F 17/30516 707/769 |
| 2013/0103716 A1 * | 4/2013 | Yamagishi | ............ | H04H 60/23 707/770 |

(Continued)

OTHER PUBLICATIONS

Pashtan, Ariel, Shriram Kollipara, and Michael Pearce. "Adapting content for wireless web services." IEEE Internet computing 5: p. 79-85. (Year: 2003).*

(Continued)

*Primary Examiner* — Chameli Das
*Assistant Examiner* — Joanne G Macasiano
(74) *Attorney, Agent, or Firm* — FisherBroyles, LLP

(57) ABSTRACT

The disclosure is directed to pushing data updates to client computing devices ("clients") in real-time. Clients can obtain data from a data storage layer by sending queries to the data storage layer that will return data compatible with the client's local data model. These queries are stored in a database and the identifier for the query ("query ID") is used instead of the query itself. In the query stored in the database, a marker is used as a proxy for a content ID of the content to be retrieved. When querying, both the query ID and the content ID are passed to the data storage layer. The query stored with the query id is loaded, the marker is substituted with the content ID, and then executed.

20 Claims, 8 Drawing Sheets

(56) References Cited

U.S. PATENT DOCUMENTS

2014/0052819 A1* 2/2014 Zhang ................ H04L 65/4084
 709/217
2016/0140188 A1* 5/2016 Balakrishnan ........ G06F 17/241
 707/722

OTHER PUBLICATIONS

Holland, Stefan, and Werner Kießling. "Situated preferences and preference repositories for personalized database applications."; International Conference on Conceptual Modeling. Springer, Berlin, Heidelberg. (Year: 2004).*

* cited by examiner

DELEGATING DATABASE QUERIES

BACKGROUND

"Push technology" is a type of Internet-based communication in which information transmission is initiated by a "publisher" or a server computing device ("server"). It is contrasted with "pull technology" in which the request for information transmission is initiated by a receiving client computing device ("client"). Services with push technology can offer to clients push services. Push services are sometimes based upon information preferences expressed in advance. For example, a client might subscribe to one or more information "channels." The server associated with the channels can then push information to the client when new content associated with the channel becomes available.

Regardless of how the users are identified for receiving the notifications, the server has to maintain a list of the users who are interested in a specific channel. For example, the server may have to store user identifications ("IDs") of all the users interested in a particular channel. If the users have installed a mobile application ("app") of the social networking application at multiple clients, the server may also have to store client device information for each of these clients in the lists. New content may become available in the subscribed channels or existing content may change in which case the server has to push the content to the subscribed users on their clients.

Typically, the server pushes the content to the clients in a standardized format. For example, the server can push an image in a specified resolution and a specified size. However, pushing the content in a standardized format to different types of clients can be disadvantageous. For example, if a smartphone and a tablet PC have different display screen sizes, presenting the image in the same format on both the clients can be disadvantageous—the image may appear small on the tablet PC, and therefore providing a substandard user experience. The real estate of the tablet PC may not be used optimally. Further, since the content is pushed in a standardized format, some of the clients, which may need to retrieve only a portion of the content, may end up downloading unnecessary content, thereby consuming additional computing and network resources.

Further, in some pull technology based services, to obtain the data from the service, the client may have to communicate with a data storage layer of the service directly. This can be inefficient, as connecting to the data storage layer consumes significant amount computing and networking resources. Typically, clients have less reliable network connection to the data storage layer and maintaining that connection can incur significant overhead, e.g., computing and networking resources.

DETAILED DESCRIPTION

Figure 1:
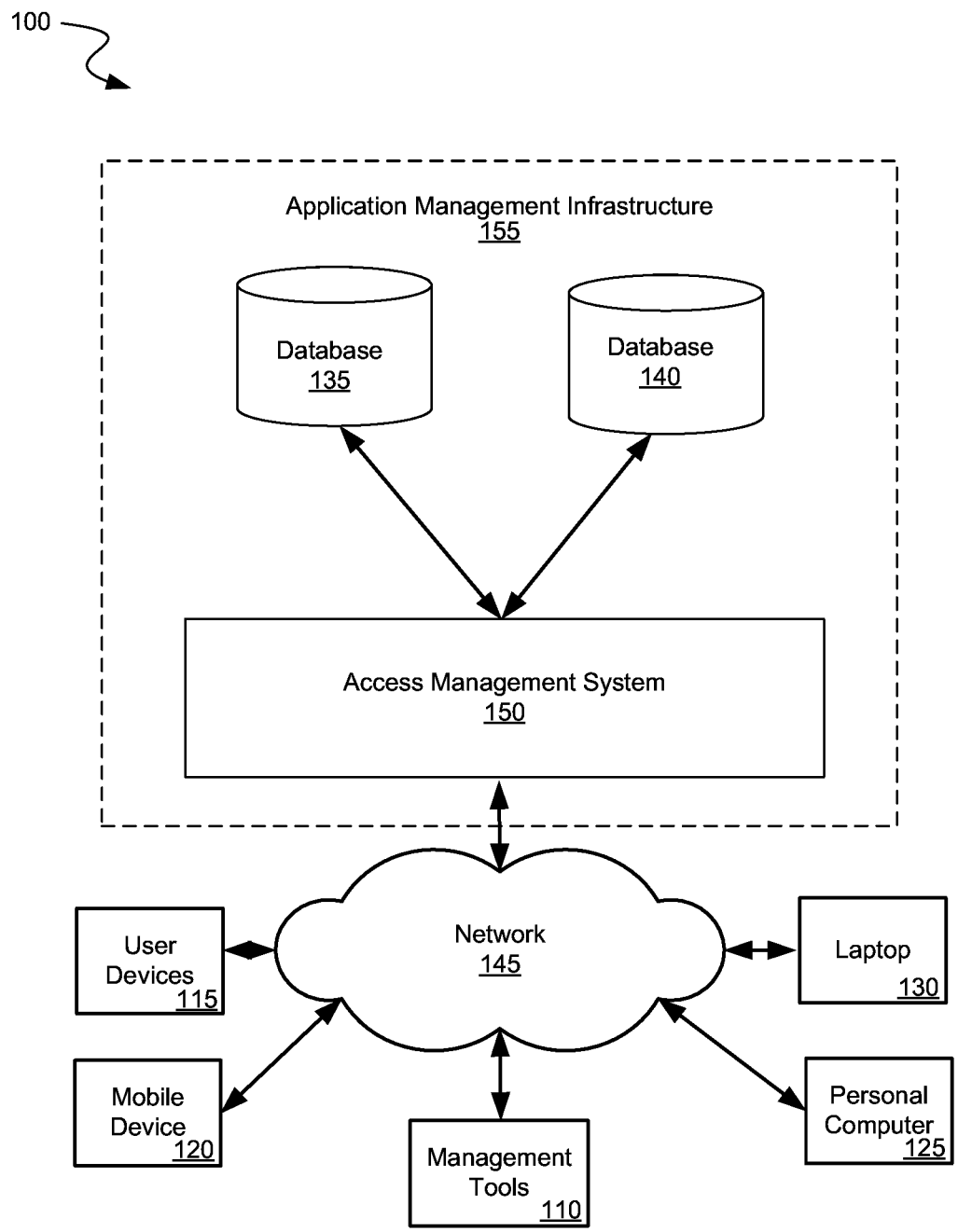
FIG. 1 is a block diagram illustrating an environment in which the disclosed embodiments may be implemented.

Embodiments are disclosed for "pushing" data updates to client computing devices ("clients") in real-time or near real-time in an efficient manner. The embodiments can push a data update to a client by delegating a query from the client, e.g., for retrieving the data, to a server computing device ("server"), which in turn queries a data storage layer on behalf of the client for retrieving the data update. The clients can use queries to query the data storage layer that will return data compatible with their local data model, e.g., data structures that facilitate storage and/or retrieval of data. These queries are stored in a storage system and the identifier ("ID") for the query ("query ID") is used instead of the query itself. In the query stored in the storage system, a marker is used as a proxy for an ID of a data object or content ("content ID") to be retrieved. When querying, both the query ID and the content ID are passed to the data storage layer. The server loads the query stored with the query ID, substitutes the content ID into the query, and requests the data storage layer to execute the query.

The client sends the query ID to an application server, which in turn loads the query corresponding to the query ID and requests a data server from the data storage layer to execute the query and obtain the data. After receiving the data from the data server, the application server can send the data to the client.

The clients can be of many types, e.g., have different hardware and/or software capabilities. For example, a client can be a smartphone, a tablet PC, a desktop computer, a laptop computer. Further, the client can be of different operating systems, e.g., iOS®, ANDROID™, Microsoft® Windows. Different clients have different processing capabilities, screen sizes, etc., and therefore, the clients may not retrieve the data from the server in the same format. Different types of clients can store the data in different formats. When an application, e.g., a social networking application, a messenger application, is developed, different versions of the queries can be developed for retrieving the same data for different types of clients. For example, a first client, e.g., an iOS smartphone, having a first set of hardware and/or software capabilities can retrieve and/or store an image in a first resolution and/or a first size, and a second client, e.g., an iOS or ANDROID smartphone, having a second set of hardware and/or software capabilities can retrieve and/or store the same image in a second resolution and/or a second size. Accordingly, the queries to obtain the image for these two clients may be different. Each of the queries has a query ID. For example, a first version of the queries generated for a first type of client has a first set of IDs and a second version of the queries generated for a second type of client has a second set of query IDs.

The application can be implemented in various ways. For example, the application can be implemented as a mobile application ("app") or as a website which can be accessed using a web browser on the client. When a user downloads the app to a client, query IDs of a specified version of the queries that is generated for that type of the client is downloaded. The specified version of the queries obtains the content in a format compatible with a data model of a type of the client the specified version is generated for. While the downloaded app may include only the query IDs and not the corresponding queries, in some embodiments, the downloaded app can also include the queries. The client sends the query IDs to the application server, which registers (or associates) the query IDs with a queue of the client. An app installation can distinctly identify a client-app pair. In some embodiments, the app installation can be a combination of an ID of a specified client ("client ID") at which the app is installed and an ID of the app. For example, an app installation ID "d1.app1" indicates that an application with ID "app1" is installed at a client with ID "d1". A queue can be a data structure that can include data to be sent to a specified app installation. In some embodiments, a queue is associated with a specified client-app pair. Note that the terms "app installation" and "client-app pair" can be used interchangeably.

The application server registers the query IDs of each of the clients with a queue of the corresponding client. For example, the application server registers a first set of query IDs from a first client with a first queue of the first client and a second set of query IDs from a second client with a second queue of the second client.

For retrieving a specified content, a client can send a query ID of the query for retrieving the specified content to the application server. The client can also send a content ID of the content to the application server. The application server can identify the query based on the query ID, insert the content ID into the query and request the data server to execute the query and return the specified content to the application server. The data server executes the query at a storage system associated with the application, retrieves the specified content and returns the specified content to the application server. The application server can then return the specified content to the client. The query obtains the content in a format that is compatible with the data model, e.g., data structures for storing the data, of the client.

In another example, an application can facilitate publishing content of a subscribed information channel to users. Typically, an application server notifies the users, e.g., on their associated clients, of any new content or changes to the existing content of the information channel, and a data server notifies the application server of any new content or changes to the existing content of the information channel in the storage system. When there is a change to the content associated with the subscribed information channel in the storage system, the data server can notify the application server regarding the change, e.g., in real time and can also send a content ID of the content that has changed to the application server. The application server can determine the queues that are associated with the information channel, retrieve, for each of the queues, a query ID of the query for retrieving the content for the corresponding client, load the query corresponding to query ID, insert the content ID into the query and request the data server to execute the query at the storage system to obtain the content. After receiving the content from the data server, the application server can send the content to the corresponding client, e.g., in real-time. The application server can perform the above steps for each of the queues associated with the subscribed information channel and send the content to the client corresponding to the queue. In some embodiments, the subscribed information channel The above embodiments are efficient and have various advantages over known services for sending data updates to clients. For example, the above embodiments enable different clients to have different data formats instead of being limited to a standardized format, and the clients can use query IDs of their corresponding queries for obtaining the data. The clients need not be restricted to obtaining data in a standardized format. The embodiments minimize network traffic because clients can only query for the data they need, and not the data that is typically retrieved in a standardized format. The embodiments also minimize the network traffic because clients can send only an ID to the server and not the actual query. The embodiments can also minimize the need for the clients to communicate directly with the data server, which can consume significant computing and networking resources, by having the application server query the data server on behalf of the client. The application server can better optimize its connection with the data server than the clients can when they connect to the data server.

Turning now to the figures, FIG. 1 depicts a block diagram illustrating an environment 100 in which the disclosed embodiments may be implemented. Companies can generate and store a tremendous amount of data (e.g., photographs, messages, e-mails, electronic documents, or healthcare records) and related analytics (e.g., usage analytics). The data can be submitted through various management tools 110, and clients such as user devices 115, mobile devices 120, personal computers 125, laptops 130, and/or other devices to allow the data to be stored at one or more databases 135 and 140. As illustrated in FIG. 1, these devices and tools may use network 145 to submit and retrieve information from the databases 135 and 140. In some embodiments, an application, e.g., a social networking application, can be implemented using the application management infrastructure 155 that the users can access to perform various activities, e.g., social networking activities. The users can access the application using the user devices via the access management system 150.

User device 115 can be any computing device capable of receiving user input as well as transmitting and/or receiving data via the network 145. The user device 115 can be a conventional computer system, such as a desktop 125 or a laptop computer 130, a mobile device 120, a smartphone, a wearable device, a tablet, or a similar device. The user device 115 is configured to communicate with access management system 150 and/or the financial account provider via the network 145. The user device 115 can access the social networking application in one or more ways. For example, the user device 115 can execute a browser application to enable interaction between the user device 115 and access management system 150 via the network 145. In another example, the user device 115 executes a client portion of the social networking application, e.g., a mobile app, allowing a user of the user device 115 to interact with the access management system 150 to access the social networking application. In another embodiment, the user device 115 interacts with the access management system 150 through an application programming interface (API) that runs on the native operating system of the user device 115, such as iOS® or ANDROID™.

The user devices 115 can be configured to communicate via the network 145, which may comprise any combination of local area and/or wide area networks, using both wired and wireless communication systems. In some embodiments, the network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 145 may be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

Figure 2:
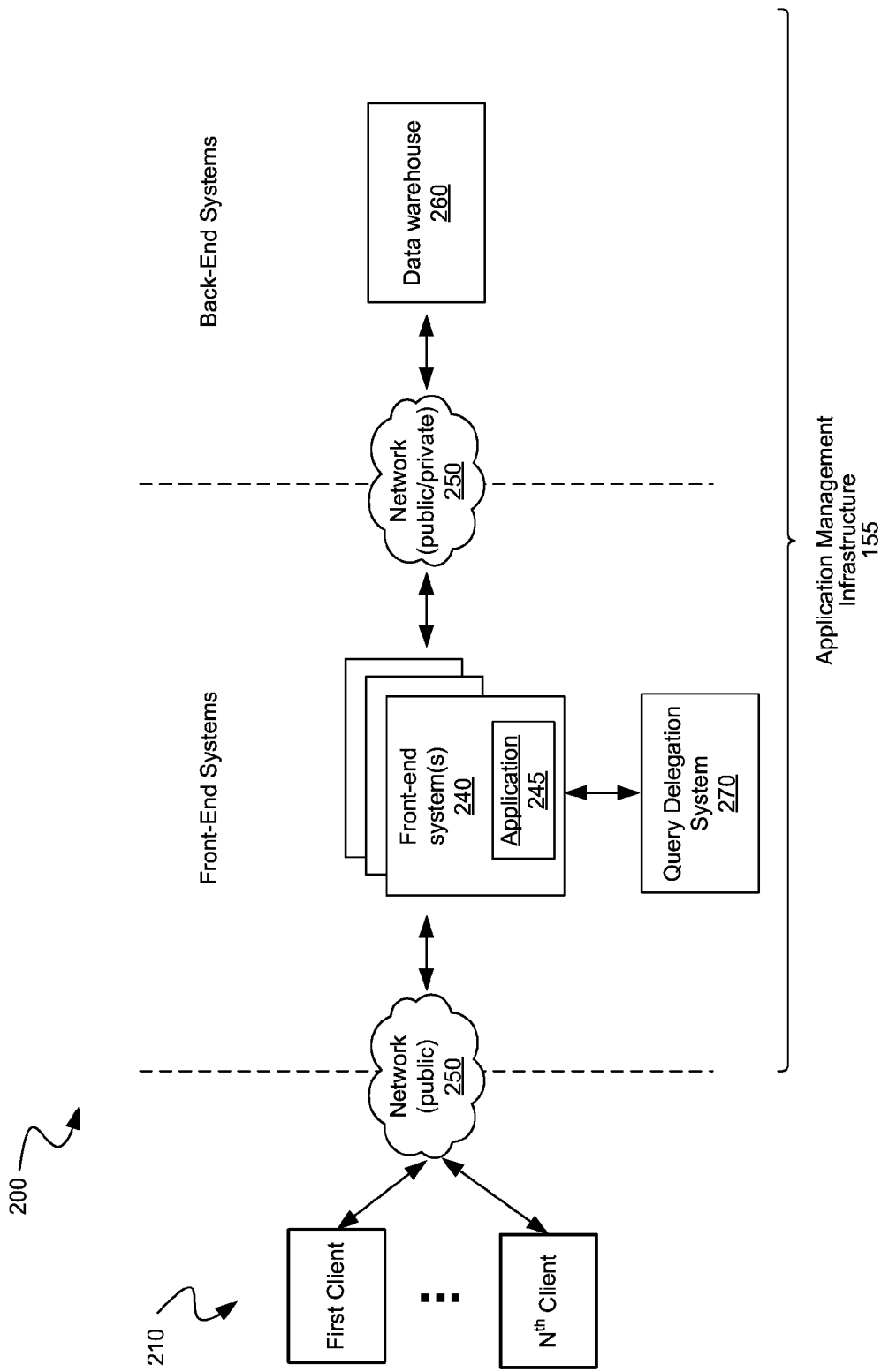
FIG. 2 is a block diagram illustrating a more detailed example of the application management infrastructure of FIG. 1, consistent with various embodiments.

FIG. 2 depicts a block diagram illustrating a more detailed example 200 of the application management infrastructure 155 of FIG. 1, consistent with various embodiments. The application management infrastructure 155 can include various front-end systems and back-end systems that can be physically and/or functionally distributed. As illustrated, the application management infrastructure 155 includes front-end systems, e.g., a front-end system 240 and a query delegation system 270, and back-end systems including a data warehouse 260. In some embodiments, the front end systems and the back end systems can collectively comprise the access management system 150 of FIG. 1. The clients or user devices 210 can be configured to communicate with the front-end system 240 via the network 250. The front-end system 240 can be configured to communicate with the clients 210 and the back-end data warehouse 260 via the network 250. The back-end data warehouse 260 can be configured to communicate with the front-end system 240 and the query delegation system 270 via the network 250. In some embodiments, the clients 210 are similar to the user devices 115 of FIG. 1.

The front-end system 240 can host an application 245, e.g., a social networking application, that can be accessed by users using their associated clients 210. In some embodiments, a portion of the application 245 is installed at the clients 210, e.g., as a mobile app. The front-end system 240 can comprise various operational systems, e.g., server computing devices, and/or relational databases. The operational systems are typically optimized for preservation of data integrity and speed of recording transactions through use of database normalization and an entity-relationship model. Fully normalized database designs often result in information being stored in hundreds or even thousands of tables. Relational databases are efficient at managing the relationships between these tables. The databases have very fast insert/update performance because only a small amount of data in those tables is affected each time a transaction is processed. For performance and other purpose, older data is periodically purged from the front-end operational system 240 to the data warehouse 260.

The back end systems can store, update and/or retrieve content from the data warehouse 260. The data warehouse 260 is a "functionally" central repository for data that is purged from multiple front-end (operational) systems 240. The data warehouse 260 is "functionally" central because it can be physically and/or functionally distributed. For example, the data warehouse 260 can include a user space for server logs associated with user data that can be sharded, e.g., partitioned, across any number of physical distributed machines. In some embodiments, the back-end data warehouse 260 stores various user profile data, data of clients 210, content to be published to the clients 210, etc. The data warehouse 260 can store current as well as historical data. For example, the back-end data warehouse 260 can store historical user data that is ten years or older. The data warehouse 260 is commonly used for operational and development purposes including, but not limited to, data analysis.

The data warehouse 260 may take a variety of forms. In some embodiments, the data warehouse 260 is configured as a distributed file storage system, e.g., Hadoop distributed file storage (HDFS).

The query delegation system 270 facilitates pushing data updates, e.g., information subscribed to by users of the application 245, to the users at one or more of their client devices in an efficient manner. In some embodiments, the query delegation system 270 pushes data updates to the clients 210 in real-time or near real-time. In some embodiments, the front-end systems are responsible for notifying the clients 210 of any data updates, and the back end systems are responsible for notifying the front-end systems of any data updates that have occurred in the data warehouse 260. Though the figure illustrates the query delegation system 270 as being implemented in the front-end systems some functionalities of the query delegation system 270 can also be implemented in the back-end systems.

Figure 3:
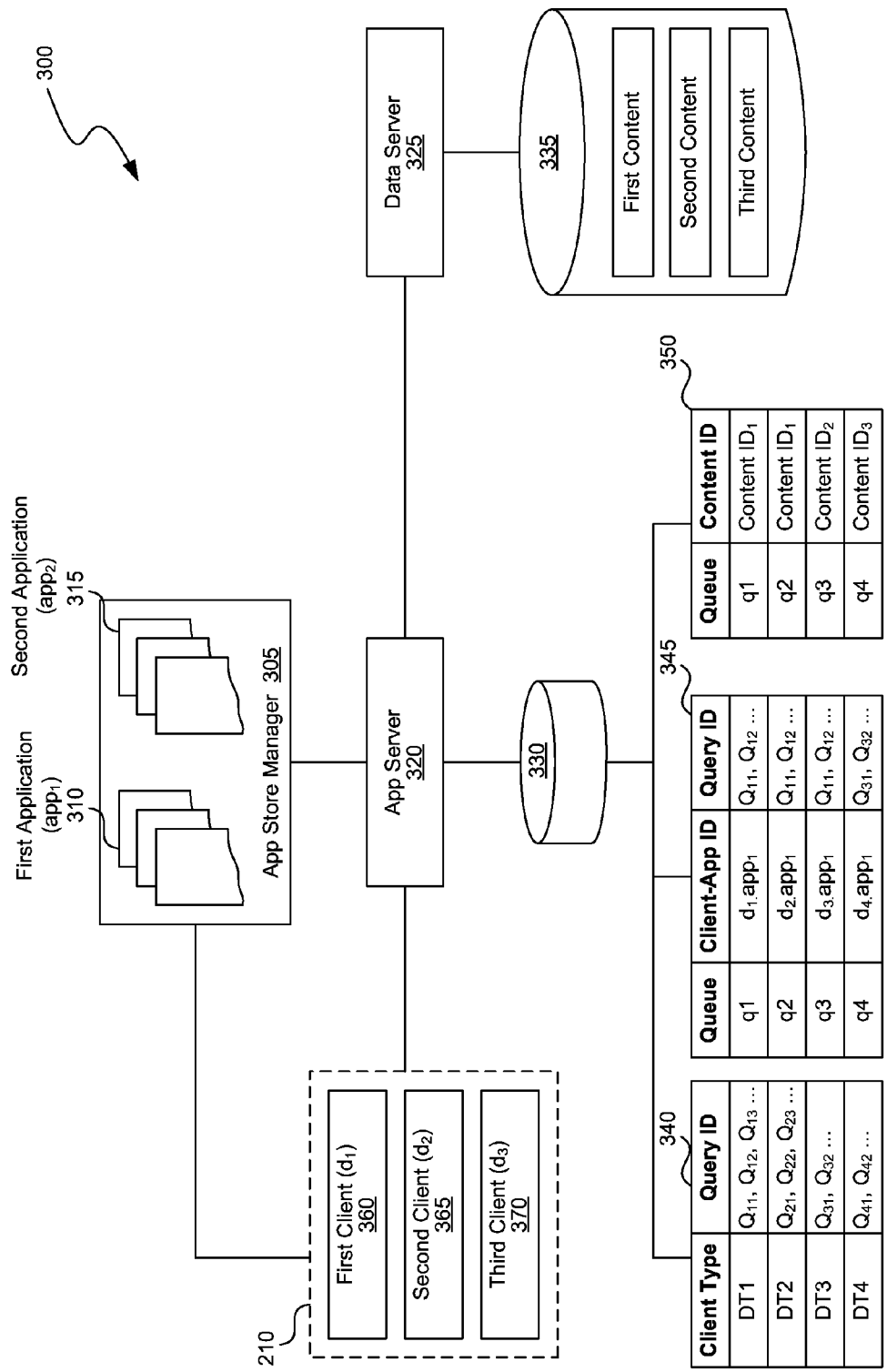
FIG. 3 is a block diagram of an example of pushing data updates to clients, consistent with various embodiments.

FIG. 3 is a block diagram of an example 300 of pushing data updates to clients, consistent with various embodiments. In some embodiments, the example 300 can be implemented using the application management infrastructure 155, e.g., the query delegation system 270 of FIG. 2. The application 245 can be implemented at an application server 320. In some embodiments, the application server 320 is similar to the front-end system 240 of FIG. 2. The application 245 can provide various services to users. For example, the application 245 can publish content on various topics. The application 245 can include various information channels each of which can publish content associated with a specified category, topic, etc. Users may subscribe to content in one or more information channels they are interested in and receive publications from the application server 320 for those information channels. In some embodiments, the application 245 can include a messenger service that facilitates two or more users to exchange messages. A data server 325 manages the content, e.g., a first content, a second content, and a third content, to be published by the application 245 to the users. The first content, second content, and the third content can belong to the same information channel or different information channels. The data server 325 can store the content in a content repository 335. In some embodiments, the data server 325 can be one of the servers in the back end systems associated with the data warehouse 260, and the content repository 335 can be part of the data warehouse 260.

An app store manager 305 can include multiple apps, e.g., a first app 310 and a second app 315. In some embodiments, the first app 310 can be a mobile app of the application 245. The clients 210 can of different types, e.g., have different hardware and/or software capabilities and therefore, can have different data models to store and/or retrieve content. For example, a first client 360 can have a larger display screen than that of a second client 365, and therefore, a version of queries that can make better use of the available real estate of the first client 360 can be generated. In another example, the second client 365 can have a storage space that is significantly smaller than that of the first client 360 and therefore, the first client 360 may have a different data storage model from that of the second client 365. Accordingly, different versions of queries can be generated for different types of clients for the first app 310. For example, consider that the first client 360 and a third client 370 are of a first type and the second client 365 is of a second type. A first version of queries can be generated for the first client 360 and the third client 370 and a second version of the queries can be generated for the second client 365.

A user can download the application 245 to a client, e.g., the first client 360, from the app store manager 305. When the first client 360 downloads the first app 310, the app store manager 305 can ensure that the first client 360 downloads query IDs of an appropriate version of the queries. For example, the first client 360 and the third client 370 download query IDs of the first version of the queries, e.g., "Q11," "Q12," "Q13" and the second client 365 downloads query IDs of the second version of the queries, e.g., "Q21", "Q22," "Q23."

The queries and their query IDs of various versions of the first app 310 can be stored in a storage system 330. For example, a query repository 340 in the storage system 330 stores the query IDs and the corresponding queries of a version of the first app 310 generated for each of the multiple types of the clients 210. In some embodiments, the storage system 330 can be part of the data warehouse 260.

When the clients 210 download the first app 310, they also obtain the query IDs of corresponding version of the queries. In some embodiments, the clients can also download the queries in addition to query IDs. The clients 210 register their query IDs with the application server 320. Upon receiving the query IDs from the client, the application server 320 stores the query IDs in association with an app installation, e.g., as illustrated in query registration repository 345. The application server 320 can create a queue for each installation of the first app 310. As described above, an app installation uniquely identifies a client-app pair. In some embodiments, the app installation can be of the form "<client ID>.<app ID>." For example, an app installation of the first app 310 at the first client 360 can be of the form "d1.app1," where "d1" is the client ID of the first client 360 and "app1" is the app ID of the first app 310.

A queue can be a data structure for storing the data that is to be published to a client for which the queue is generated. In some embodiments, a queue can correspond to a specific app installation. The application server 320 can register the query IDs received from a client with a queue associated with the client-app pair. For example, as illustrated in the query registration repository 345, the application server 320 registers the query IDs "Q11," "Q12," "Q13" received from the first client 360 with the queue "q1" associated with the client-app pair "d1.app1" that distinctly identifies the app installation at the first client 360. Similarly, the application server 320 registers the query IDs "Q21," "Q22," "Q23" received from the second client 365 with the queue "q2" associated with the client-app pair "d2.app1" that distinctly identifies the app installation at the second client 365.

The application server 320 can also store the subscription information of the clients in a subscription repository 350. The subscription information can include the information channels and or content to which the clients have subscribed. The subscription repository 350 can store a mapping of a queue associated with a client-app pair to the content to which the client has subscribed. For example, if the first client 360 has subscribed to the first content, the application server 320 can store a mapping of the queue, e.g., "q1," associated with the client-app pair of the first client 360 and the first app 310 to the first content, "content ID1." The content can include a variety of information, e.g., sports news, information from news feed of a social networking application, comments posted in the social networking application, messages exchanged between two or more users, information on various other topics, etc. Whenever the content in the content repository 335 is updated, e.g., existing content is changed or new content is added, the application server 320 pushes the data update to the clients 210 that have subscribed to the content, e.g., in real-time or near real-time.

In some embodiments, the application server 320 pushes the data updates to the clients 210 in an efficient manner, e.g., by consuming minimum computing and networking resources. When a content, e.g., the first content, is updated in the content repository 335, the data server 325 notifies the application server 320 regarding the update to the first content, e.g., in real-time. In some embodiments, the data server 325 can also send the content ID of the content that is updated. The application server 320 can determine the clients that have subscribed to the first content using the subscription repository 350, e.g., by identifying the queues to which the content ID of the changed content is mapped. After identifying the clients that have subscribed to the first content, the application server 320 retrieves a query ID of the query for retrieving the first content for each of the subscribed clients and from the query registration repository 345. For example, the first client 360, "d1" and the second client 365, "d2" have subscribed to the first content "content ID1." The application server 320 retrieves the query ID "Q11" that corresponds to the query for retrieving the content for the first client 360, and retrieves the query ID "Q21" that corresponds to the query for retrieving the content for the second client 365.

After retrieving the query ID, the application server 320 loads the corresponding query from the query repository 340, inserts the content ID received from the data server 325 into the retrieved query and requests the data server 325 to execute the query, e.g., at the content repository 335 to retrieve the content. For example, for the first client 360, the application server 320 loads the query corresponding to query ID "Q11" and inserts the content ID "content ID1" into the query. The data server 325 retrieves the content and stores it in the queue, e.g., "q1" with which the query "Q11" is associated. The application server 320 can then send the content to the client, e.g., the first client 360, associated with the queue "q1." Thus, the application server 320 can push the data updates to the client in real-time or near real-time. The application server 320 can similarly have the data server 325 obtain the content for the second client 365 based on the query "Q21." In some embodiments, the queries "Q11" and "Q21" obtain the content in different formats, e.g., in formats that are compatible with the data model of the corresponding clients. For example, the query "Q11" can obtain the content in the format that is compatible with the data model of the first client 360 and the query "Q21" can obtain the content in the format that is compatible with the data model of the second client 365.

In some embodiments, if the query executed by the data server 325 fails, the application server 320 instructs the subscribed clients to query the data server 325 themselves to obtain the updated content.

In some embodiments, when the queries are stored in the data warehouse 260, the application server 320 can insert place markers into the queries, which can be substituted with various attributes. For example, the application server 320 can insert a place marker for a content ID in the query, which can be substituted with the actual content ID, e.g., that is provided by the data server 325.

In some embodiments, a client can "pull" the content from the application 245 using the query IDs. For example, the first client 360 can pull the first content by providing a query ID, "Q11," of a query for retrieving the first content, and content ID "content ID1" of the first content to the application server 320. The application server 320 can load the query corresponding to the query ID "Q11", e.g., from the query repository 340, substitute the place marker for the content ID with the content ID "content ID1" of the first content and request, on behalf of the first client 360, the data server 325 to execute the query and obtain the first content. The data server 325 retrieves the content from the content repository 335 based on the query "Q11" and stores the content in the queue, e.g., "q1" with which the query "Q11" is associated. The application server 320 can then send the content to the client, e.g., the first client 360, associated with the queue "q1."

The various component, functions, and or tools that can be associated with and/or included within the query delegation system 270 are discussed in detail with reference to FIG. 4 below.

Figure 4:
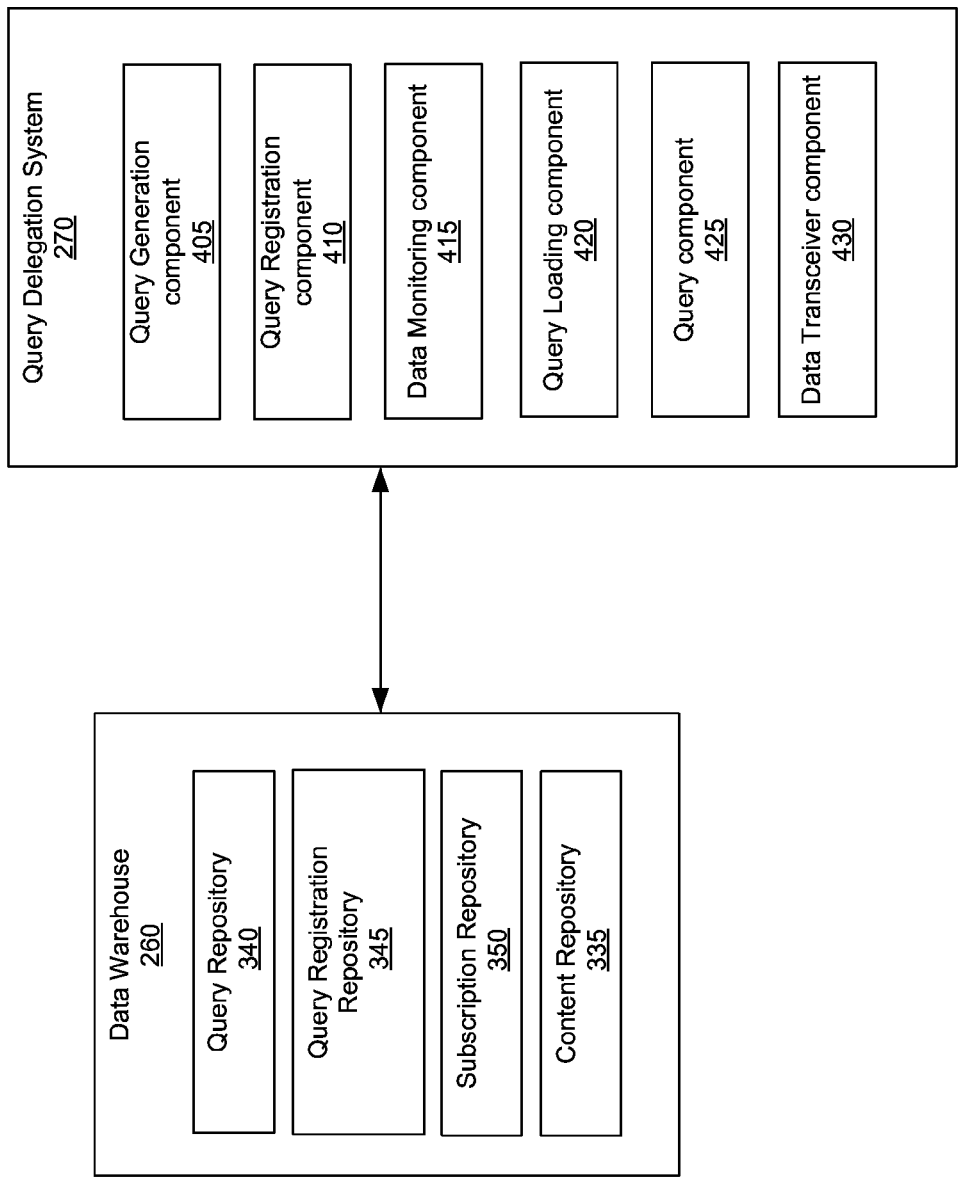
FIG. 4 is a block diagram of the query delegation system and back end systems of FIG. 2, consistent with various embodiments.

FIG. 4 is a block diagram of the query delegation system and back end systems of FIG. 2, consistent with various embodiments. The data warehouse 260 stores a variety of information associated with the application 245 of FIG. 2. For example, the data warehouse 260 includes the query repository 340, the query registration repository 345, the subscription repository 350 and the content repository 335. The above data can be stored in a single database of the data warehouse 260, or at least some of these data can be distributed across various databases, e.g., databases 135 and 140 in the data warehouse 260.

The query delegation system 270 can include a query generation component 405 that can be used to generate queries for various applications, e.g., the first app 310 and the second app 315. The query generation component 405 can also generate various versions of queries for an application. The query generation component 405 can also generate a query ID for each of the queries, and persist the queries with their query IDs in the data warehouse 260, e.g., in the query repository 340. The query generation component 405 can generate one or more place markers, e.g., a place marker for the content ID of the content to be retrieved, in the query which act as a proxy for one or more attributes. The place markers can be replaced with the actual value of the attributes when the query is executed.

The query delegation system 270 can include a query registration component 410 that can register the query IDs received from a client with a queue associated with the client. For example, when the first client 360 connects to the application server 320 of FIG. 3, the first app 310 at the first client 360 sends the query IDs "Q11," "Q12," "Q13," etc., it downloaded, to the application server 320 for registration. The query registration component 410 can register the query IDs received from the first client 360 with the queue "q1" associated with the first client 360.

The query delegation system 270 can include a data monitoring component 415 that monitors the content in the content repository 335 for any changes. If the content in the content repository changes, e.g., a new content is added or an existing content is changed, the data monitoring component 415 can send a notification to a destination, e.g., a query loading component 420. In some embodiments, the data monitoring component 415 can also send the content ID of the content that has changed.

The query loading component 420 can load a query associated with a specified query ID from the data warehouse 260 for execution. The query loading component 420 can obtain or derive the query ID in many ways. For example, a client that needs to retrieve a specified content can provide the query ID of the corresponding query to the query loading component 420. In another example, when the data monitoring component 415 notifies the query loading component 420 regarding an update to a specified content, the query loading component 420 can determine, e.g., using the subscription repository 350, the clients that have subscribed to the content and then retrieve the corresponding query IDs registered for those subscribed clients. The query loading component 420 can also substitute the place markers in the query with the actual values of the attributes to which the place markers correspond. The query loading component 420 can obtain the actual values of the attributes from one or more sources, e.g., a client, the data monitoring component 415, etc.

The query delegation system 270 can include a query component 425 that can execute a query loaded by the query loading component 420 to retrieve the content specified by the query. In some embodiments, the query component 425 can execute the query on the data warehouse 260.

The query delegation system 270 can include a data transceiver component 430 that can send the content retrieved by the query component 425 to the client. In some embodiments, the data transceiver component 430 can also receive a data retrieval request from the client. The data transceiver component 430 can extract various attributes from the request, e.g., a query ID, a content ID of content to be retrieved.

Note that the query delegation system 270 is not restricted to the above components. The query delegation system 270 can include lesser number of components, e.g., functionalities of two components can be combined into one component, or can include more number of components, e.g., components that perform other functionalities or functionalities of a component can be split into two or more components. Further, in some embodiments, the query delegation system 270 can be implemented as a distributed system, e.g., the components of the query delegation system 270 can be distributed over various systems. For example, the query registration component 410, the query loading component 420 and the data transceiver component 430 can be implemented at the application server 320; the data monitoring component 415 may be implemented at the data server 325; the query component 425 may be implemented at the application server 320 and/or the data server 325; and the query generation component 405 may be implemented at a stand-alone system or a server that is used to develop the first app 310.

Figure 5:
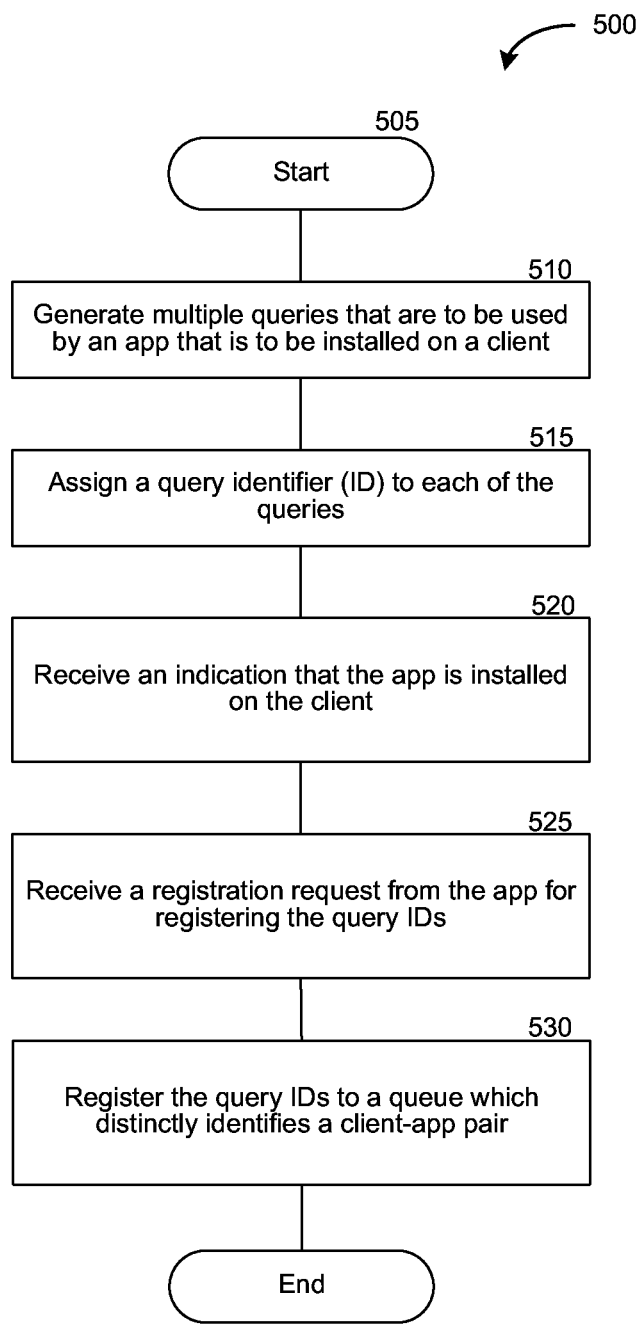
FIG. 5 is a flow diagram of a process of registering query IDs received from a client, consistent with various embodiments.

FIG. 5 is a flow diagram of a process 500 of registering query IDs received from a client, consistent with various embodiments. In some embodiments, the process 500 may be implemented using the query delegation system 270. The process 500 begins at block 505, and at block 510, the query generation component 405 generates multiple queries that are to be used by an app, e.g., the first app 310, that is to be installed at a client, e.g., the first client 360. In some embodiments, the queries are to be used by the app for retrieving a variety of content from the server and presenting the content at the client. In some embodiments, the query generation component 405 can generate a set of queries for each type of the client the app would be installed on. The set of queries generated for retrieving a specified content for a first type of client can be different from a set of queries generated for a second type of the client. A set of queries generated for a specified type of client can retrieve the specified content in a format that is compatible with a data model of the specified type of the client.

At block 515, the query generation component 405 assigns a query ID to each of the queries. For example, if the query generation component 405 has generated three different queries for a first type of the client, the query generation component 405 can assign the query IDs "Q11," "Q12," "Q13" to the queries, respectively. Similarly, the query generation component 405 can assign the query IDs "Q21," "Q22," "Q23" to the queries generated for the second type of the clients. The three different queries can be for retrieving different content.

At block 520, the query registration component 410 receives an indication from a client that the app is installed at the client. For example, the query registration component 410 receives an indication from the first client 360 that the first app 310 is installed at the first client 360. In some embodiments, the query registration component 410 can receive the above indication when the first client 360 contacts the application server 320 for the first time after the first app 310 is installed at the first client 360. When a client downloads the first app 310, it also downloads the query IDs of the queries that are generated for a specified type of the client. For example, when the first client 360 downloads the first app 310, it downloads the query IDs "Q11," "Q12," "Q13" of the queries that are generated for the type which the first client 360 is.

At block 525, the query registration component 410 receives a registration request from the app installed at the client for registering the query IDs of the queries in the app. For example, the query registration component 410 receives a registration request from the first client 360 for registering the query IDs "Q11," "Q12," "Q13" which the first client 360 downloaded.

At block 530, the query registration component 410 registers the query IDs to a queue associated with a specified installation of the app. For example, the query registration component 410 registers the query IDs "Q11," "Q12," "Q13" with a queue "q1" associated with the app installation "d1.app1," which indicates the installation of the first app 310, "app1," at the first client 360, "d1."

Figure 6:
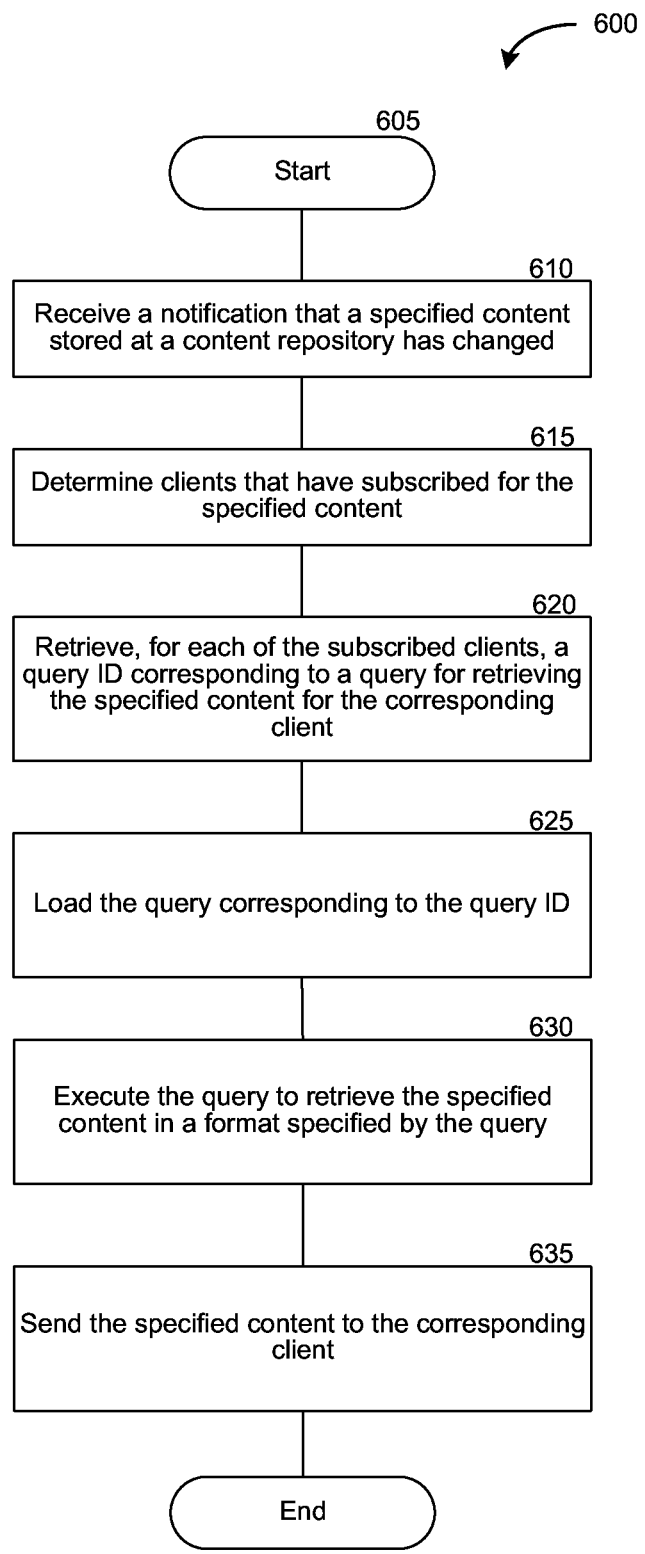
FIG. 6 is a flow diagram of a process of pushing a data update to a client, consistent with various embodiments.

FIG. 6 is a flow diagram of a process 600 of pushing a data update to a client, consistent with various embodiments. In some embodiments, the process 600 may be implemented using the query delegation system 270 of FIG. 2. The process 600 begins at block 605, and at block 610, the query loading component 420 receives a notification from the data monitoring component 415 that a specified content stored at a content repository has changed. In some embodiments, the data monitoring component 415 can also send the content ID of the specified content.

At block 615, the query loading component 420 determines the clients that have subscribed to the specified content. In some embodiments, the query loading component 420 can determine the clients that have subscribed to the specified content using the subscription repository 350. For example, the query loading component 420 identifies the clients by identifying the queues that are mapped to the specified content in the subscription repository.

At block 620, the query loading component 420 retrieves, for each of the subscribed clients, a query ID of a query for retrieving the specified content for the corresponding client. For example, as illustrated in the subscription repository 350 of FIG. 3, the first client 360, "d1" and the second client 365, "d2" have subscribed to the first content "content ID1." The application server 320 retrieves the query ID "Q11" that corresponds to the query for retrieving the content for the first client 360, and retrieves the query ID "Q21" that corresponds to the query for retrieving the content for the second client 365 from the query registration repository 345.

After retrieving the query ID, at block 625, the query loading component 420 can load the query associated with the query ID, e.g., from the query repository 340, for execution. The query loading component 420 can also substitute the place markers in the query with the actual values of the attributes to which the place markers correspond. The query loading component 420 can obtain the actual values of the attributes from one or more sources, e.g., a client, the data monitoring component 415, etc. For example, the query loading component 420 can substitute the place marker for the content ID with the content ID obtained from the data monitoring component 415.

At block 630, the query component 425 can execute the query at the content repository 335 to retrieve the specified content in a format specified by the query. For example, the query component 425 can retrieve the specified content based on the format specified by the query "Q11."

At block 635, the data transceiver component 430 can send the content to the corresponding client. In some embodiments, the process described at least with reference to blocks 620-635 is performed for each of the clients determined in the block 615.

Figure 7:
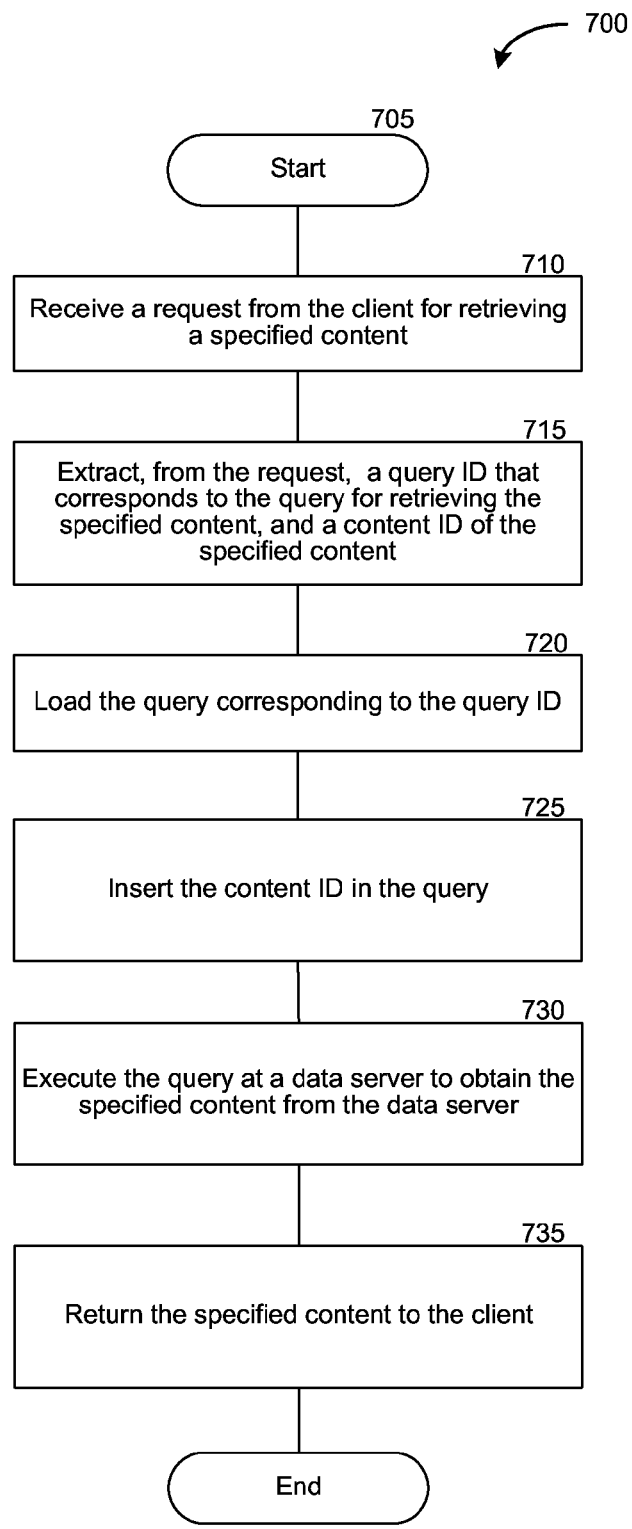
FIG. 7 is a flow diagram of a process of pulling content from a server by a client, consistent with various embodiments.

FIG. 7 is a flow diagram of a process 700 of pulling content from a server by a client, consistent with various embodiments. In some embodiments, the process 700 may be implemented using the query delegation system 270 of FIG. 2. The process 700 begins at block 705, and at block 710, the data transceiver component 430 receives a request from the client for retrieving a specified content from the application 245.

At block 715, the data transceiver component 430 extracts a query ID from the request. The query ID corresponds to the query for retrieving the content. The data transceiver component 430 also extracts content ID of the specified content from the request.

At block 720, the query loading component 420 loads the query corresponding to the query ID, e.g., from the query repository 340.

At block 725, the query loading component 420 inserts the content ID extracted from the request in the query, e.g., substitutes the place marker for the content ID in the query with the content ID extracted from the request.

At block 730, the query component 425 executes the query at the content repository 335 to obtain the specified content.

At block 735, the data transceiver component 430 returns the specified content to the client.

Figure 8:
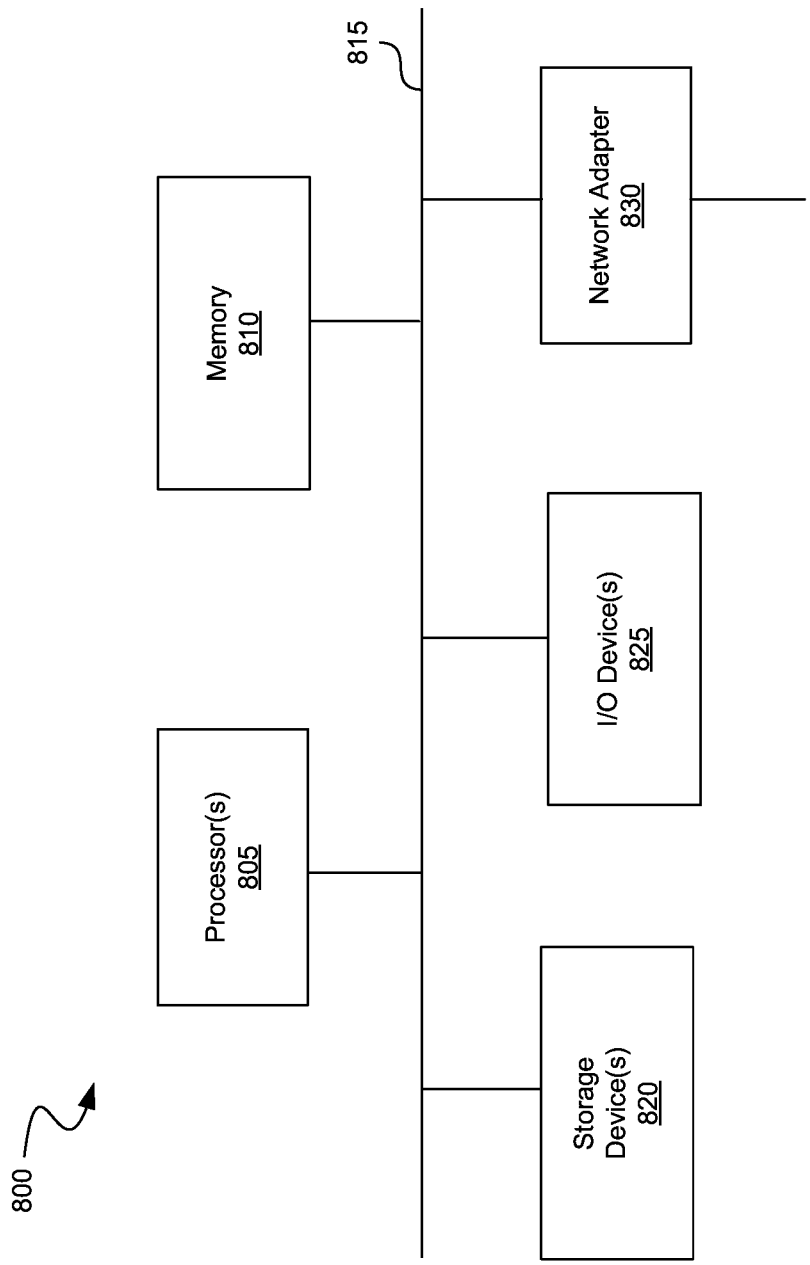
FIG. 8 is a block diagram of a processing system that can implement operations, consistent with various embodiments.

FIG. 8 is a block diagram of a computer system as may be used to implement features of the disclosed embodiments. The computing system 800 may be used to implement any of the entities, components or services depicted in the examples of the foregoing figures (and any other components and/or modules described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI)

bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by an application server computing device ("application server"), comprising:
  generating multiple versions of a set of queries to be used to query a data storage layer of a data server for content on behalf of a client application, wherein each version is configured to obtain content that is compatible with a different type of client computing device;
  assigning a different query identifier ("ID") to each of the queries within each version of the set of queries;
  receiving, from a client computing device:
    an indication that an instance of the client application has been installed at the client computing device;
    a set of query IDs corresponding to a type of the client; and
    a request to register the set of query IDs to a queue of the client computing device stored at the application server;
  in response to receiving the request, registering each query ID with the set of query IDs to the client's queue;
  after registering each query ID, receiving a first query ID and a content ID from the client computing device, wherein the first query ID comprises one of the query IDs included in the set of query IDs registered to the client's queue;
  in response to receiving the first query ID and the content ID:
    loading a first query, to which the query ID has been assigned, and inserting, into the first query, the content ID;
    sending a request to the data storage layer, on behalf of the client, that the data storage layer execute the first query;
  obtaining, from the data storage layer, a specified content corresponding to the content ID; and
  transmitting the specified content to the client.

2. The method of claim 1, wherein the set of query IDs was downloaded to the client computing device as part of an installation process for the client application.

3. The method of claim 1, wherein:
the client application comprises a client portion of a social-networking application; and
the application server comprises an access management system associated with the social-networking application.

4. The method of claim 1, wherein receiving the first query ID and the content ID includes receiving multiple query parameters from the client computing device, the query parameters to be inserted in the first query.

5. The method of claim 1, wherein the type of the client computing device is based on a software attribute of the client computing system.

6. The method of claim 5, wherein the software attribute comprises an operating system of the client computing device.

7. The method of claim 1, wherein the type of the client computing device is based on a hardware attribute of the client computing system.

8. The method of claim 7, wherein the hardware attribute comprises a device-type comprising at least one of:
a smartphone;
a table;
a desktop computer; or
a laptop computer.

9. The method of claim 7, wherein the hardware attribute comprises a screen size of the client computing device.

10. The method of claim 7, wherein the hardware attribute comprises at least one of:
a processing capability of the client computing device;
a data storage model of the client computing device; or
an amount of storage space of the client computing device.

11. The method of claim 1 further comprising:
receiving an indication from the data server that a specified content associated with the queue has changed, the indication including a content ID of the specified content;
retrieving the specified content for the client computing device; and
sending the specified content to the client computing device.

12. The method of claim 1, wherein the first query comprises a request to subscribe to content for one or more information channels managed by the data server.

13. The method of claim 12, wherein the first query further comprises a request to receive publications for the one or more information channels.

14. The method of claim 12, further comprising storing subscription information for the client computing system in a subscription repository.

15. A computer-readable storage medium storing computer-readable instructions, comprising:
instructions for generating multiple versions of a set of queries to be used to query a data storage layer of a data server for content on behalf of a client application, wherein each version is configured to obtain content that is compatible with a different type of client computing device;
instructions for assigning a different query identifier ("ID") to each of the queries within each version of the set of queries;
instructions for receiving, from a client computing device:
an indication that an instance of the client application has been installed at the client;
a set of query IDs corresponding to a type of the client; and
a request to register the set of query IDs to a queue of the client computing device;
instructions for registering each query ID within the set of query IDs to the client's queue;
instructions for receiving a first query ID and a content ID from the client, wherein the first query ID comprises one of the query IDs included in the set of query IDs registered to the client's queue;
instructions for loading a first query, to which the query ID had been assigned, and inserting, into the first query, the content ID;
instructions for sending a request to the data storage layer, on behalf of the client, that the data storage layer execute the first query;
instructions for obtaining, from the data storage layer, a specified content corresponding to the content ID; and
instructions for returning the specified content to the client.

16. The computer-readable storage medium of claim 15, wherein the set of query IDs was downloaded to the client computing device as part of an installation process for the client application.

17. The computer-readable storage medium of claim 15, wherein the client application comprises a client portion of a social-networking application.

18. The computer-readable storage medium of claim 15, wherein the type of the client computing device is based on at least one of a software attribute or a hardware attribute of the client computing system.

19. A system, comprising:
a processor;
a first component configured to generate multiple versions of a set of queries to be used to query a data storage layer of a data server for content on behalf of a client application, wherein each version is configured to obtain content that is compatible with a different type of client computing device;
a second component configured to assign a different query identifier ("ID") to each of the queries within each version of the set of queries;
a third component configured to receive, from a client computing device:
an indication that an instance of the client application has been installed at the client computing device;
a set of query IDs corresponding to a type of the client; and
a request to register the set of query IDs to a queue of the client computing device;
a fourth component configured to register each query ID with the set of query IDs to the client's queue;
a fifth component configured to receive a first query ID and a content ID from the client computing device, wherein the first query ID comprises one of the query IDs included in the set of query IDs registered to the client's queue; and
a sixth component configured to, in response to the fifth component receiving the first query ID and the content ID:
load a first query, to which the query ID has been assigned, and inserting, into the first query, the content ID;

send a request to the data storage layer, on behalf of the client, that the data storage layer execute the first query;

obtain, from the data storage layer, a specified content corresponding to the content ID; and transmit the specified content to the client.

20. The system of claim 19, wherein the set of query IDs was downloaded to the client computing device as part of an installation process for the client application.

* * * * *